US009457676B2

(12) United States Patent
Abe et al.

(10) Patent No.: US 9,457,676 B2
(45) Date of Patent: Oct. 4, 2016

(54) CONTACTLESS POWER TRANSFER APPARATUS

(75) Inventors: Shigeru Abe, Saitama (JP); Tomio Yasuda, Saitama (JP); Akira Suzuki, Aichi (JP)

(73) Assignees: TECHNOVA INC., Tokyo (JP); NATIONAL UNIVERSITY CORPORATION SAITAMA UNIVERSITY, Saitama (JP)

( * ) Notice: Subject to any disclaimer, the term of this patent is extended or adjusted under 35 U.S.C. 154(b) by 621 days.

(21) Appl. No.: 13/984,148

(22) PCT Filed: Feb. 7, 2012

(86) PCT No.: PCT/JP2012/052751
§ 371 (c)(1),
(2), (4) Date: Aug. 7, 2013

(87) PCT Pub. No.: WO2012/108432
PCT Pub. Date: Aug. 16, 2012

(65) Prior Publication Data
US 2013/0313912 A1 Nov. 28, 2013

(30) Foreign Application Priority Data
Feb. 10, 2011 (JP) ................. 2011-027548

(51) Int. Cl.
*H01F 38/14* (2006.01)
*B60L 11/14* (2006.01)
(Continued)

(52) U.S. Cl.
CPC .............. *B60L 11/182* (2013.01); *B60L 11/14* (2013.01); *B60L 11/1824* (2013.01);
(Continued)

(58) Field of Classification Search
CPC ........ H02J 7/025; H01F 38/14; B60L 11/182
USPC ......................................... 307/104
See application file for complete search history.

(56) References Cited

U.S. PATENT DOCUMENTS

| 2008/0197802 A1 | 8/2008 | Onishi et al. |
| 2010/0033156 A1 | 2/2010 | Abe et al. |
| 2010/0164295 A1 | 7/2010 | Ichikawa et al. |

FOREIGN PATENT DOCUMENTS

| CN | 101771297 A | 7/2010 |
| JP | 2010-172084 A | 8/2010 |

(Continued)

OTHER PUBLICATIONS

International Search Report mailed May 1, 2012 in PCT/JP2012/052751.
(Continued)

*Primary Examiner* — Rexford Barnie
*Assistant Examiner* — Thai Tran
(74) *Attorney, Agent, or Firm* — Rothwell, Figg, Ernst & Manbeck, P.C.

(57) ABSTRACT

According to one embodiment, contactless power transfer apparatus includes: transmission coil; primary capacitor; reception coil opposing transmission coil through gap; and secondary capacitor. Specification of frequency of the transmission coil and that of the reception coil are equal. At least one of electrical power specification and gap length specification of the transmission coil differ from the reception coil. When the electrical power specification of the power transmission coil differ from that of the power reception coil, the power is supplied from the transmission coil to the reception coil by using smaller one of the power of the transmission coil and of the reception coil as maximum power. When the gap length specification of the transmission coil differs from that of the reception coil, the transmission coil opposes the reception coil through the gap length, which is the specification of the transmission coil.

11 Claims, 8 Drawing Sheets

CONTACTLESS POWER TRANSFER SYSTEM (51) Int. Cl.
  *B60L 11/18* (2006.01)
  *H02J 5/00* (2016.01)
  *H02M 3/335* (2006.01)
  *H02J 7/02* (2016.01)

(52) U.S. Cl.
  CPC ....... *B60L 11/1833* (2013.01); *B60L 11/1846* (2013.01); *B60L 11/1861* (2013.01); *H01F 38/14* (2013.01); *H02J 5/005* (2013.01); *H02M 3/335* (2013.01); *B60L 2210/10* (2013.01); *B60L 2210/30* (2013.01); *B60L 2210/40* (2013.01); *B60L 2230/16* (2013.01); *B60L 2250/10* (2013.01); *H02J 7/025* (2013.01); *Y02T 10/70* (2013.01); *Y02T 10/705* (2013.01); *Y02T 10/7005* (2013.01); *Y02T 10/7044* (2013.01); *Y02T 10/7077* (2013.01); *Y02T 10/7088* (2013.01); *Y02T 10/7216* (2013.01); *Y02T 10/7241* (2013.01); *Y02T 90/121* (2013.01); *Y02T 90/122* (2013.01); *Y02T 90/125* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

FOREIGN PATENT DOCUMENTS

| | | |
|---|---|---|
| JP | 2011-50127 A | 3/2011 |
| WO | 2007/029438 A1 | 3/2007 |

OTHER PUBLICATIONS

Nagatsuka Y et al, "Compact Contactless Power Transfer System for Electric Vehicles," the 2010 International Power Electronics Conference; IPEC-SAPPORO 2010—[ECCE Asia]; Sapporo, Japan, IEEE, Piscataway, NJ, USA, Jun. 21, 2010 pp. 807-813.

Yuichi Nagatsuka et al, "Contactless Power Transfer System for Electric Vehicle Battery Charger," The 25th World Battery, Hybrid and Fuel Cell Electric Vehicle Symposium & Exhibition, EVS-25 Shenzhen, China, Nov. 9, 2010, pp. 1-6 XP055244834.

The Extended European Search Report mailed Feb. 8, 2016 in corresponding European Patent Application No. 12744406.5 (8 pages).

FIG.1

CONTACTLESS POWER TRANSFER SYSTEM

Normal: NORMAL CHARGE 1.5 kW, Rapid: RAPID CHARGE 10 kW
Short: GAP LENGTH 70 mm, Long: GAP LENGTH 140 mm

|      |              | C2NS          | C2RS         | C2NL          | C2RL          |
|------|--------------|---------------|--------------|---------------|---------------|
|      |              | 1.5 kW 70 mm  | 10 kW 70 mm  | 1.5 kW 140 mm | 10 kW 140 mm  |
| C1NS | 1.5 kW 70 mm | O             | 1.5 kW 70 mm | 1.5 kW 70 mm  | 1.5 kW 70 mm  |
| C1RS | 10 kW 70 mm  | 1.5 kW 70 mm  | O            | 1.5 kW 70 mm  | 10 kW 70 mm   |
| C1NL | 1.5 kW 140 mm| 1.5 kW 140 mm | 1.5 kW 140 mm| O             | 1.5 kW 140 mm |
| C1RL | 10 kW 140 mm | 1.5 kW 140 mm | 10 kW 140 mm | 1.5 kW 140 mm | O             |

| | | 1.5 kW 300 HA | 10 kW 300 HAW |
|---|---|---|---|
| NUMBER OF TURNS | PRIMARY SIDE | 20 | 20 |
| | SECONDARY SIDE | 6 | 6 |
| NUMBER OF PARALLEL WINDING WIRE | PRIMARY SIDE | 3 | 4 |
| | SECONDARY SIDE | 9 | 12 |
| CORE THICKNESS [mm] | PRIMARY SIDE | 10 | 15 |
| | SECONDARY SIDE | 5 | 10 |

| TRANSFORMER | | (1) | (2) | (3) | (4) |
|---|---|---|---|---|---|
| | PRIMARY SIDE | 1.5 kW TRANSFORMER | 10 kW TRANSFORMER | 1.5 kW TRANSFORMER | 10 kW TRANSFORMER |
| | SECONDARY SIDE | 10 kW TRANSFORMER | 1.5 kW TRANSFORMER | | |
| CIRCUIT | | FIG.7 (a) | FIG.7 (b) | | |
| MECHANICAL GAP [mm] | | 70 | | | |
| MAGNETIC GAP [mm] | | 80 | | | |
| NUMBER OF TURNS | PRIMARY SIDE | 20×3p | 20×4p | 20×3p | 20×4p |
| | SECONDARY SIDE | 6×12p | 6×9p | 6×9p | 6×12p |
| FREQUENCY [kHz] | | 30 | | | |
| COUPLING FACTOR k | | 0.322 | 0.332 | 0.333 | 0.357 |
| ELECTRIC POWER TO BE FED [kW] | | 1.5 | 1.5 | 1.5 | 10 |
| TRANSFORMER EFFICIENCY [%] | | 94.8 | 94.7 | 94.9 | 94.7 |

CONTACTLESS POWER TRANSFER APPARATUS

CROSS REFERENCE TO RELATED APPLICATIONS

This application is a 35 U.S.C. 371 National Phase Entry Application from PCT/JP2012/052751, filed Feb. 7, 2012, which claims the benefit of Japanese Patent Application No. 2011-027548, filed Feb. 10, 2011, the disclosures of which are incorporated herein in their entirety by reference.

TECHNICAL FIELD

The present invention relates to a contactless power transfer apparatus that supplies power to a moving object such as an electric vehicle in a contactless manner, and enables power supply between a power transmission coil and a power reception coil having different specification.

BACKGROUND ART

A contactless power transfer apparatus supplies electrical power from a power transmission coil (primary coil) to a power reception coil (secondary coil) by using electromagnetic induction between the power transmission coil and the power reception coil. The contactless power transfer apparatus can be used to charge a secondary battery installed in an electric vehicle or a plug-in hybrid electric vehicle, and a demand for the contactless power transfer apparatus for charging the vehicles is expected to expand in the future.

In a case of the contactless power transfer apparatus for charging the vehicles, contactless power transfer is performed by parking an automobile with the power reception coil installed on an underside of a floor thereof, so that the power reception coil is positioned just above the power transmission coil placed on a ground. However, due to misalignment in a horizontal direction and a gap length variation in a vertical direction between the power transmission coil and the power reception coil, a coupling factor between the power transmission coil and the power reception coil might change.

In order to prevent a decrease in a power-receiving efficiency due to the misalignment and the gap length variation between the power transmission coil and the power reception coil, it is necessary to secure a large opposing area between the coils, whereby it is inevitable that a coil shape becomes larger in size.

Figure 9A:
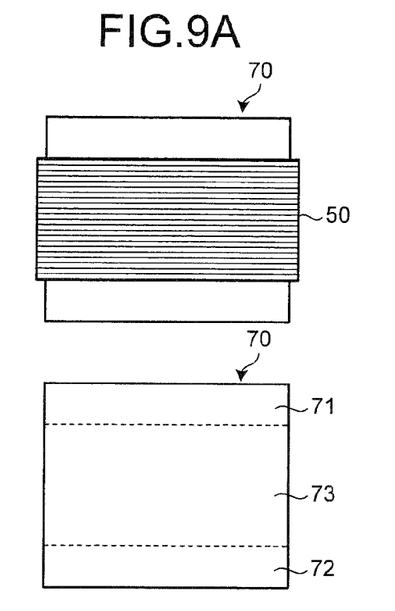
FIGS. 9A-9B are views view illustrating a contactless power supply transformer provided with a rectangular core or an H-shaped core.

However, by using a coil (double-sided winding coil) around which a wire 50 is wound at a central part of a rectangular core 70 as in FIG. 9A, it is possible to make the size smaller than a coil having a winding wire arranged on a single side of a core thereof (single-sided winding coil) as described in Patent Literature 1 below. At the top of FIG. 9A is the core provided with the winding wire, and at the bottom is the core alone. Both ends 71 and 72 of the core 70, around which the wire 50 is not wound, are magnetic pole portions where a magnetic flux flows in or out.

Figure 9B:
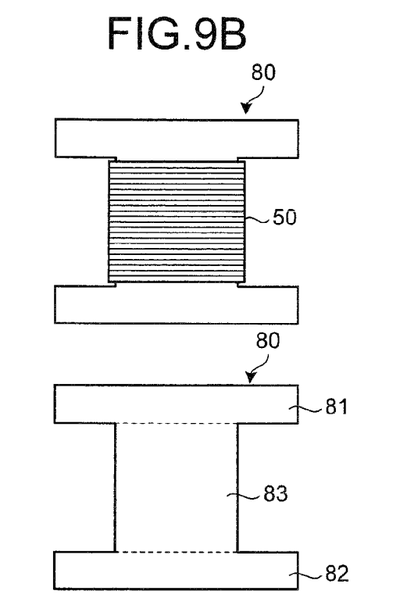

Furthermore, the present inventors have already proposed an H-shaped core 80, which allows for a reduction in size and saving of an amount of a core material, as in FIG. 9B (see Patent Literature 2). In this H-type core, the wire 50 is wound around a horizontal bar part 83 of an H shape, and vertical bars 81 and 82 parallel to each other are the magnetic pole portions.

Figure 10:
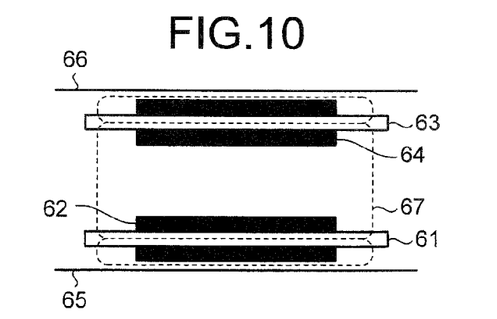
FIG. 10 is a view illustrating a magnetic flux of the contactless power supply transformer of double-sided winding.

As in FIG. 10, in a case where the power transmission coil and the power reception coil, which are double-sided winding coils, oppose each other, a main magnetic flux 67 flows out from a magnetic pole portion of a core 61 of the power transmission coil, enters a magnetic pole portion of a core 63 of the power reception coil, passes through a core portion thereof around which a wire 64 is wound, flows out from the other magnetic pole portion thereof, enters a magnetic pole portion of the core 61 of the power transmission coil, passes through the core portion thereof around which a wire 62 is wound, and reaches the other magnetic pole portion.

Note that in the contactless power transfer apparatus using the double-sided winding coils, aluminum boards 65 and 66 are arranged at the back of the coils in order to magnetically shield a leakage flux.

Figure 11:
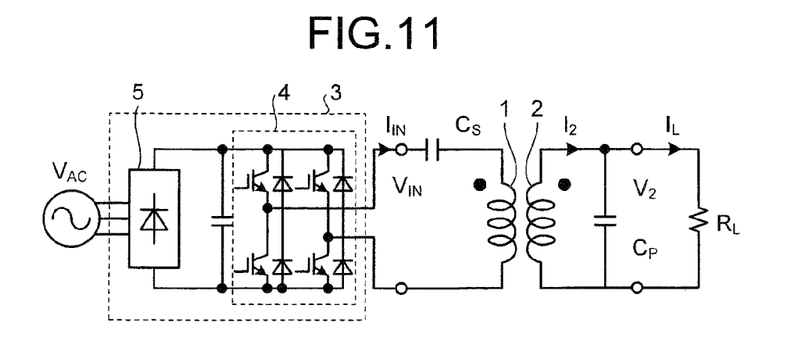
FIG. 11 is a circuit diagram of a contactless power transfer system.

Furthermore, FIG. 11 is a circuit diagram of a contactless power transfer system described in Patent Literature 3 below. This circuit includes: a high frequency power source 3 having a rectifier 5, which rectifies an alternate current of a commercial power supply VAC, and an inverter 4, which generates and outputs a high frequency; a power transmission coil 1; a primary side series capacitor CS, which is connected in series between the high frequency power supply 3 and the power transmission coil 1; a power reception coil 2 opposing the power transmission coil 1; a secondary side resonant capacitor CP connected in parallel to the power reception coil 2; and a load RL.

Figure 12:
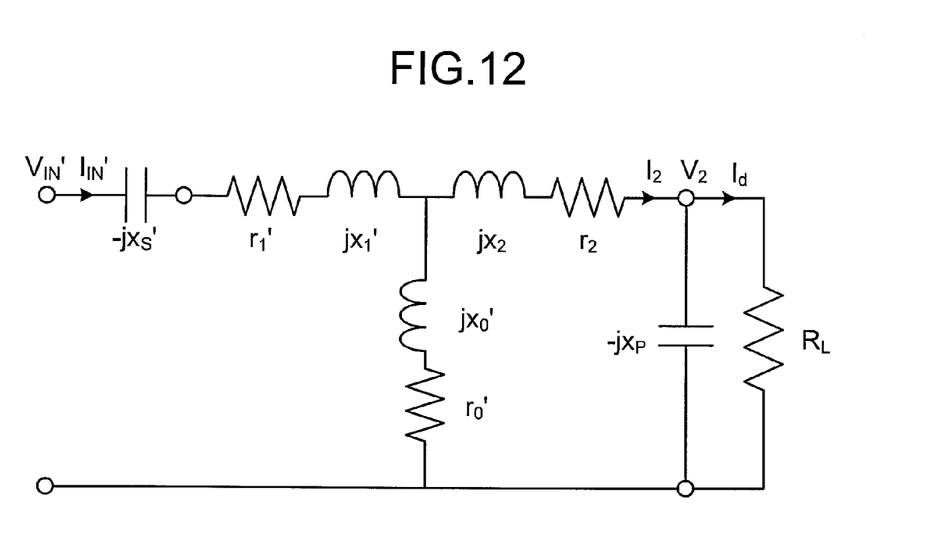
FIG. 12 is a equivalent circuit of FIG. 11.

This equivalent circuit can be illustrated as in FIG. 12, and a value CS of the primary side series capacitor and a value CP of the secondary side parallel resonant capacitor are set as the following based on a resonance condition:

$$\omega 0 = 2\pi f 0$$

$$1/\omega 0 CP = \omega 0 L2 = xP = x0' + x2$$

$$1/\omega 0 CS = xS' = \{(x0' \cdot x2)/(x0' + x2)\} + x1'$$

Here, f0 is a frequency of the high frequency power source 3, and L2 is self-inductance of the power reception coil.

In the contactless power transfer apparatus provided with the primary side series capacitor CS and the secondary side parallel resonant capacitor CP, the contactless power supply transformer (power transmission coil and power reception coil) becomes equivalent to an ideal transformer by setting CP and CS in this way, whereby designing thereof becomes easier. Furthermore, in a case where the load RL is a resistance load, a power factor of the high frequency power supply 3 always becomes one.

CITATION LIST

Patent Literature

Patent Literature 1: Japanese Patent Application Laid-open No. 2010-172084
Patent Literature 2: Japanese Patent Application Laid-open No. 2011-50127
Patent Literature 3: WO 2007-029438

SUMMARY OF INVENTION

Problems to be Solved by the Invention

As forms of using a contactless power transfer apparatus for vehicle charging, it can be considered cases where a normal charge is performed using a low-capacity contactless power supply transformer (long charge) at home and where a rapid charge is performed using a high-capacity contactless power supply transformer at a parking lot and the like.

Between the low-capacity contactless power supply transformer and the high-capacity contactless power supply transformer, a specification related to electrical power to be supplied is different.

Furthermore, at the parking lot and the like, it is assumed that a form in which a power transmission coil is buried in a ground such that only a surface of the power transmission coil is visible on a surface of the ground becomes the mainstream. At home, it is assumed that a simple form in which the power transmission coil is placed on the surface of the ground becomes the mainstream. In such cases, a gap length of the contactless power supply transformer is longer when the power transmission coil is buried in the ground. Therefore, it is possible that a gap length specification may vary according to each contactless power supply transformer.

However, conventionally, power supply has been considered only between the power transmission coil and the power reception coil having the same specification.

Figure 13:
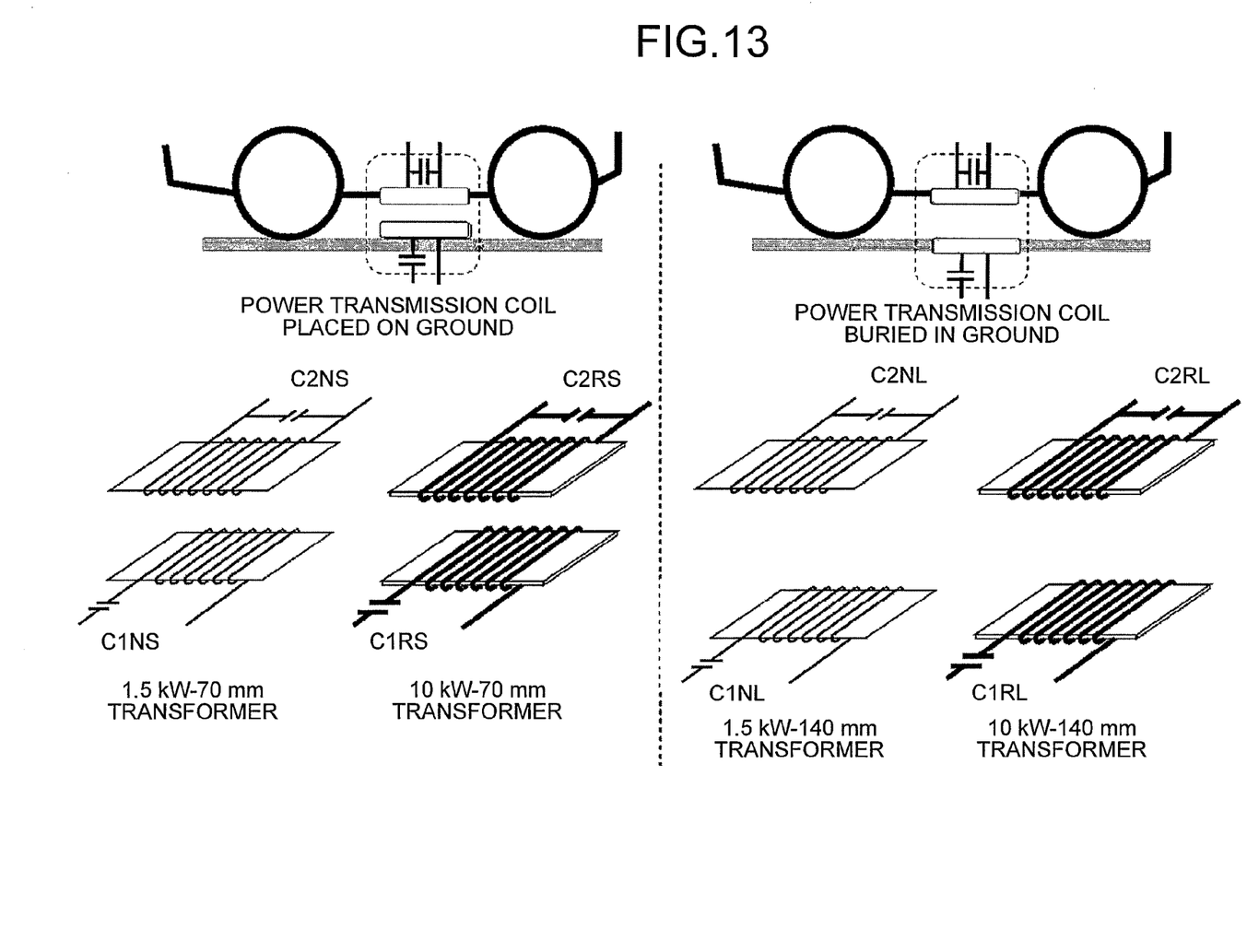
FIG. 13 is a view illustrating a combination of a power transmission coil and a power reception coil in a conventional contactless power transfer apparatus.

FIG. 13 is a schematic illustration of a conventional power supply mode. Here, the power transmission coil is denoted by C1, and the power reception coil is denoted by C2. Furthermore, a coil having a specification of power supply performance of 1.5 kW is denoted by N, and a coil having a specification of power supply performance of 10 kW is denoted by R. Also, a coil having a gap length specification of 70 mm is denoted by S, and a coil having a gap length specification of 140 mm is denoted by L.

In the conventional contactless power transfer apparatus, a C2NS power reception coil is set to receive electrical power from a C1NS power transmission coil only. Similarly, a C2RS power reception coil is set to receive electrical power from a C1RS power transmission coil, a C2NL power reception coil from a C1NL power transmission coil, and a C2RL power reception coil from a C1RL power transmission coil.

In this way, in a case where multiple types of specifications exist for the contactless power supply transformer, it is extremely inconvenient if power receiving is possible only from a power transmission coil that matches with the specification of the power reception coil installed in a vehicle, and the power receiving is not possible from any other power transmission coils.

Furthermore, it is inconvenient if power reception coils of multiple types of specifications need to be installed in a vehicle such that the power receiving becomes possible from the power transmission coils of multiple types of specifications, because it leads to an increased vehicle weight and an increased cost.

The present invention has been invented in view of these circumstances, and an object thereof is to provide a contactless power transfer apparatus in which power supply is possible between a power transmission coil and a power reception coil, each having a different specification, and in which the power transmission coil and the power reception coil can be commonly used in the contactless power supply transformers having multiple specifications.

Means for Solving Problem

A contactless power transfer apparatus according to the present invention comprises: a power transmission coil; a primary side capacitor connected to the power transmission coil in series or parallel; a power reception coil opposing the power transmission coil through a gap; and a secondary side resonant capacitor connected to the power reception coil in parallel. Power is supplied from the power transmission coil to the power reception coil. The power transmission coil and the power reception coil includes: a rectangular or H-shaped core having magnetic pole portions at both ends; and a wire wound around a core part between the magnetic pole portions. The specification of a power source frequency of the power transmission coil and a specification of a resonance frequency of the power reception coil are equal to each other. At least one of a specification of an electrical power and a specification of a gap length of the power transmission coil is different from corresponding specification of the power reception coil. When the specification of the electrical power of the power transmission coil and the specification of the electrical power of the power reception coil differ from each other, the power supply is performed from the power transmission coil to the power reception coil by using smaller one of the electrical power of the power transmission coil and the electrical power of the power reception coil as a maximum electrical power capable of being supplied. When the specification of the gap length of the power transmission coil and the specification of the gap length of the power reception coil differ from each other, the power supply is performed by having the power transmission coil and the power reception coil oppose each other through the gap length, which is the specification of the power transmission coil.

In order to allow the power supply even when the specifications are different between the power transmission coil and the power reception coil of the contactless power supply transformer, according to the contactless power supply transformer of each specification, (1) the cores of the power transmission coil and the power reception coil have either rectangular or H-shaped, (2) the power transmission coil and the power reception coil are double-sided winding coils, (3) a power source frequency are set to be common, and (4) a secondary side resonant capacitor is connected in parallel to a power reception coil.

Then, in a case where the specification of the electrical power is different between the power transmission coil and the power reception coil, power supply is performed by using smaller one of the electrical power. Furthermore, in a case where the gap length specification is different between the power transmission coil and the power reception coil, power supply is performed b using a gap length specification of the power transmission coil.

Furthermore, in the contactless power transfer apparatus according to the present invention, when the coupling engaging factor between the power transmission coil and the power reception coil is KAB, a coupling factor between the power transmission coil and a regular power reception coil (i.e., a power reception coil having a specification of the electrical power and a specification of the gap length the same as the specification of that of the power transmission coil) is KA, and a coupling factor between the power reception coil and a regular power transmission coil (i.e., a power transmission coil having the same specification of the electrical power and a specification of the gap length the same as that of the power reception coil) is KB, $0.5 KA \leq KAB \leq 2KA$ and $0.5 KB \leq KAB \leq 2KB$.

In order to perform a highly efficient power supply in a case where different specifications are combined, it is necessary that the coupling factor KAB between the power transmission coil and the power reception coil be high. When the coupling factor between the power transmission coil and a regularly-combined power reception coil is KA, and the coupling factor between the power reception coil and a regularly-combined power transmission coil is KB, a coupling factor in the same level as the coupling factor of a regular combination is secured by designing core shapes and the numbers of turns of the power transmission coil and the power reception coil such that the above inequality is satisfied.

Furthermore, in the contactless power transfer apparatus according to the present invention, a number of turns of a wire wound around a core part of the power reception coil is to be constant.

The number of turns of the power transmission coil and the number of turns of the power reception coil are important parameters for determining a voltage ratio between the power transmission coil and the power reception coil. In a case of a specification with a long gap length, compared to a case of a specification with a short gap length, the coupling factor decreases while a voltage of the power reception coil increases even when a voltage of the power transmission coil is constant. For an on-vehicle device, a voltage change of the power reception coil is not preferable. Therefore, in an effort to commonly use the contactless power supply transformers, having different gap length specifications, a measure for preventing the voltage change of the power reception coil due to a gap length difference is necessary. In the present invention, the number of turns of the power reception coil is unified, and the number of turns of the power transmission coil is varied in order to deal with this voltage change of the power reception coil.

Furthermore, in the contactless power transfer apparatus according to the present invention, when the gap length specification of the power transmission coil is the same as the gap length specification of the power reception coil, the number of turns of the wire wound around the core part of the power transmission coil is set to be equal to the number of turns of the wire wound around the regular power transmission coil of the power reception coil.

The number of turns of a winding wire of the power transmission coil having the same gap length specification is set to be the same number.

Furthermore, in the contactless power transfer apparatus according to the present invention, when the gap length specification of the power transmission coil is longer than the gap length specification of the power reception coil, the number of turns of the wire wound around the core part of the power transmission coil is set to be larger than the number of turns of the wire wound around the regular power transmission coil of the power reception coil.

Between the contactless power supply transformers having different gap length specifications, the number of turns of the power reception coil is unified, and the number of turns N1L of a power transmission transformer having a longer gap length is set to be larger than the number of turns N1S of a transformer having a shorter gap length (N1L≤N1S). As in FIG. 13, the gap length specification changes mainly depending on whether the power transmission coil is placed on a surface of the ground or buried in the ground. Therefore, in order to prevent the voltage change of the power reception coil due to the difference in the gap length, it is preferable to keep the number of turns of the on-vehicle power reception coil constant and adjust the number of turns of the power transmission coil.

Furthermore, in the contactless power transfer apparatus according to the present invention, when a length of a magnetic pole portion of the power transmission coil is LA, a width thereof is WA, a distance between the magnetic pole portions at both ends of the core is DA, a length of a magnetic pole portion of the power reception coil is LB, a width thereof is WB, and a distance between the magnetic pole portions at both ends of the core is DB, $$0.5 \times LB \leq LA \leq 2 \times LB$$

$$DB \leq DA \leq DB + 2 \times WB \text{ or } DA \leq DB \leq DA + 2 \times WA.$$

In this way, an overlap of magnetic pole portions of the power transmission coil and the power reception coil can be obtained in the contactless power supply transformer, which combines the power transmission coil and the power reception coil, each having different specifications.

Furthermore, in the contactless power transfer apparatus according to the present invention, a value CP of the secondary side resonant capacitor connected in parallel to the power reception coil is set so as to resonate with L2 at a power source frequency f0. Here, L2 is a self-inductance of the power reception coil in a state in which the power transmission coil having a specification the same as that of the power reception coil is placed at a position of a gap length in an open state.

The value CP of the secondary side resonant capacitor is set to be in resonance with the power transmission coil, which is to be regularly combined with the power reception coil, in the contactless power supply transformer.

Furthermore, in the contactless power transfer apparatus according to the present invention, the primary side capacitor is connected in series between the power transmission coil and a high frequency power supply, and a value CS of the primary side capacitor is set so that an output power factor of the high frequency power source becomes one in a state where the power reception coil is connected in parallel to the secondary side resonant capacitor CP and the resistance load RL.

Furthermore, in the contactless power transfer apparatus according to the present invention, there is provided an adjustment unit that adjusts the value CS of the primary side capacitor. The adjustment unit adjusts the value CS of the primary side capacitor so that the output power factor of the high frequency power source becomes one.

In a case where the output power factor of the high frequency power supply deviates largely from one depending on a combination of the power transmission coil and the power reception coil having different specifications, the value CS of the primary side capacitor is adjusted to switch to an optimum value.

Furthermore, in the contactless power transfer apparatus according to the present invention, it is possible to combine the power transmission coil and the power reception coil even in a case where the specification of the electrical power to be supplied of the power transmission coil and the specification of the electrical power to be supplied of the power reception coil are different by more than twice.

Furthermore, in the contactless power transfer apparatus according to the present invention, even in a case where the gap length specification of the power transmission coil and the gap length specification of the power reception coil are different by more than 1.5 times, it is possible to combine the power transmission coil and the power reception coil.

Effect of the Invention

A contactless power transfer apparatus according to the present invention is capable of supplying electrical power between a power transmission coil and a power reception coil, each having a different specification, and the power transmission coil and the power reception coil can be commonly used in contactless power supply transformers having different specifications.

MODE(S) FOR CARRYING OUT THE INVENTION

Figure 1:
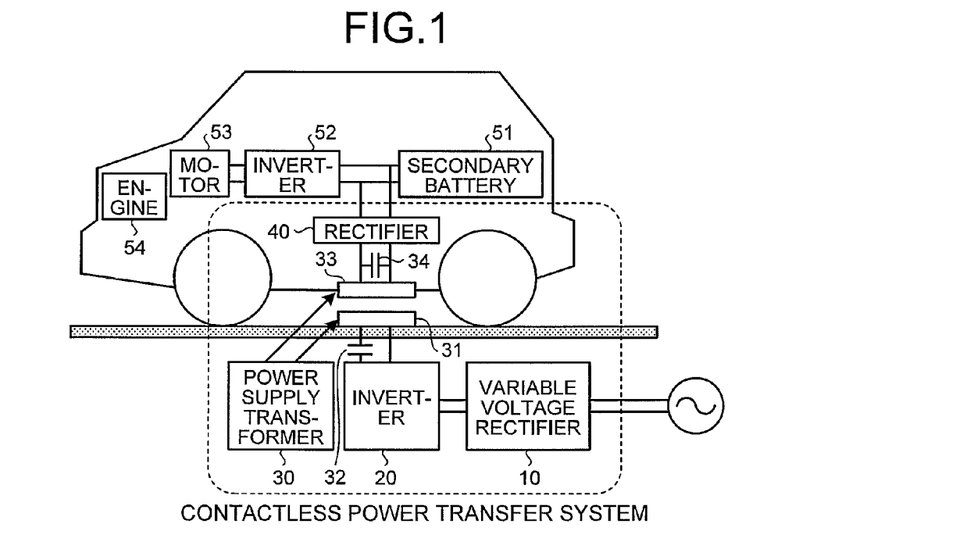
FIG. 1 is a view illustrating a contactless power transfer system for vehicle charging.

FIG. 1 schematically illustrates a mode in which a contactless power transfer system according to the present invention is used for charging a plug-in hybrid electric vehicle.

The plug-in hybrid electric vehicle to be charged is installed with a motor 53 as a driving source together with an engine 54, and includes: a secondary battery 51, which is a power supply for the motor; and an inverter 52, which converts a direct current of the secondary battery into an alternate current and supplies it to the motor.

The contactless power transfer system, which performs power supply to the secondary battery 51, on the ground side, includes: a variable voltage rectifier 10, which converts an alternate current of a commercial power supply into a direct current and varies a voltage thereof; an inverter 20, which generates a high frequency alternate current from the direct current; a power transmission coil 31, which is one part of a contactless power supply transformer 30; a primary side series capacitor 32, which is connected in series to the power transmission coil. On the vehicle side, the contactless power transfer system includes: a power reception coil 33, which is other part of the contactless power supply transformer 30; a rectifier 40, which converts an alternate current into a direct current for the secondary battery, and a secondary side parallel resonant capacitor 34 connected in parallel between the power reception coil and the rectifier.

Figure 2:
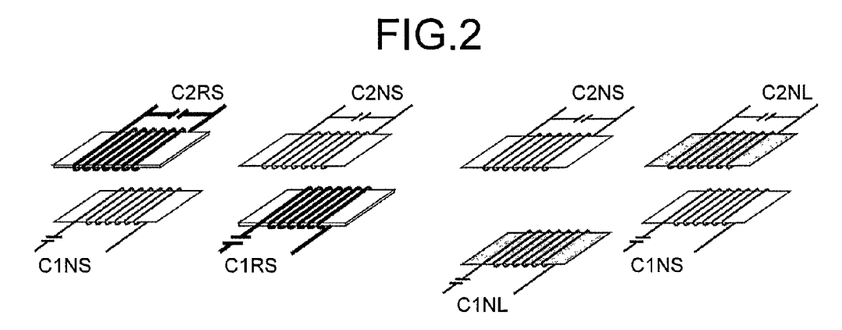
FIG. 2 is a view illustrating an example of a combination of a power transmission coil and a power reception coil of a contactless power transfer apparatus according to the present invention.

FIG. 2 schematically illustrates an example of a combination of the power transmission coil and the power reception coil of the contactless power transfer apparatus of the present invention. Here, in the same way as FIG. 13, the power transmission coil is denoted by C1, and the power reception coil is denoted by C2. A coil having a specification of power supply performance of 1.5 kW is denoted by N, a coil having a specification of power supply performance of 10 kW is denoted by R, a coil having a gap length specification of 70 mm is denoted by S, and a coil having a gap length specification of 140 mm is denoted by L.

The contactless power transfer apparatus according to the present invention is capable of combining a C2RS power reception coil with a C1NS power transmission coil, a C2NS power reception coil with a C1RS power transmission coil, a C2NS power reception coil with a C1NL power transmission coil, or a C2NL power reception coil with a C1NS power transmission coil.

Figure 3:
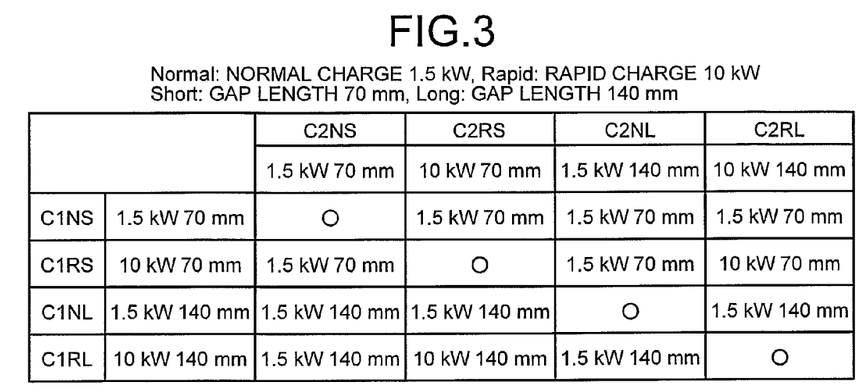
FIG. 3 is a view illustrating maximum electrical power that can be supplied by the contactless power transfer apparatus in which the power transmission coil and the power reception coil having different specifications are combined, and a maximum gap length.

A table of FIG. 3 illustrates maximum electrical power that can be supplied by the contactless power supply transformer in which the power transmission coil of each specification, listed vertically, and the power reception coil of each specification, listed horizontally, are combined, and a maximum gap length. (Note that gap lengths of 70 mm and 140 mm are the standard gap lengths, and the power supply is still possible in a case where the gap length is varied by about plus or minus 40% from the standard value.)

As in FIG. 3, in the contactless power supply transformer in which the power transmission coil and the power reception coil having the different specifications are combined, a smaller one of the electrical power to be supplied by the power transmission coil and the electrical power to be supplied by the power reception coil is set as the maximum electrical power that can be supplied.

Furthermore, a maximum gap length of this contactless power supply transformer is set to be a gap length of the specification of the power transmission coil.

In this way, in order to make the power transmission coil and the power reception coil commonly usable on contactless power supply transformers having different specifications, the contactless power supply transformers each having different specifications need to conform with the following requirements.

(a) Cores of the power transmission coil and the power reception coil are either rectangular or H-shaped, and the power transmission coil and the power reception coil are double-sided winding coils. This is because the double-sided winding coil is capable of compensating misalignment between the power transmission coil and the power reception coil at a small shape, as compared to the single-sided winding coil.

(b) The power source frequency (output frequency of the inverter 20) of the contactless power supply transformer of each specification is unified.

(c) The secondary side resonant capacitor is connected in parallel to the power reception coil. Furthermore, it is preferable that the primary side capacitor is connected in series to the power transmission coil. In this way, the contactless power supply transformer can be made substantially equivalent to the ideal transformer, and designing thereof becomes simple. Furthermore, in a case where the load connected in parallel to the power reception coil is a resistance load, it is possible to adjust the power factor of the high frequency power supply 3 to be closer to one by adjusting a value of the primary side capacitor. Adjustment of the primary side capacitor is, for example, performed by switching the circuit to an optimum capacitor by preparing capacitors of multiple values.

Note that the primary side capacitor may also be connected in parallel to the power transmission coil.

(d) In order to perform high efficiency power supply in the contactless power supply transformer in which the power transmission coil and the power reception coil having different specifications are combined, it is necessary that a coupling factor between the power transmission coil and the power reception coil is set to be high. Therefore, when a coupling factor of the contactless power supply transformer in which a power transmission coil C1 and a power reception coil C2 having different specifications are combined is KAB, a coupling factor of a regular contactless power supply transformer in which a power transmission coil C1 and a power reception coil of the same specification are combined is KA, and a coupling factor of a regular contactless power supply transformer in which the power reception coil C2 and a power transmission coil of the same specification are combined is KB, a setting is made so as to satisfy the following:

$$0.5KA \leq KAB \leq 2KA \text{ and } 0.5KB \leq KAB \leq 2KB.$$

(e) It is necessary to set the power reception coil so that the voltage change thereof does not occur even when it is combined with a power transmission coil having a long gap length specification or when it is combined with a power transmission coil having a short gap length specification. In a case of a specification with a long gap length, the coupling factor decreases while a voltage of the power reception coil increases even when a voltage of the power transmission coil is constant. For an on-vehicle device, a voltage change of the power reception coil is not preferable. Therefore, it is necessary to prevent the voltage change of the power reception coil even if the gap length specification of the power transmission coil is different.

The specifications (material, shape, size, the number of turns, and the like) of the cores and the windings of the power transmission coil and the power reception coil are determined so as to satisfy these requirements (d) and (e).

Figure 4:
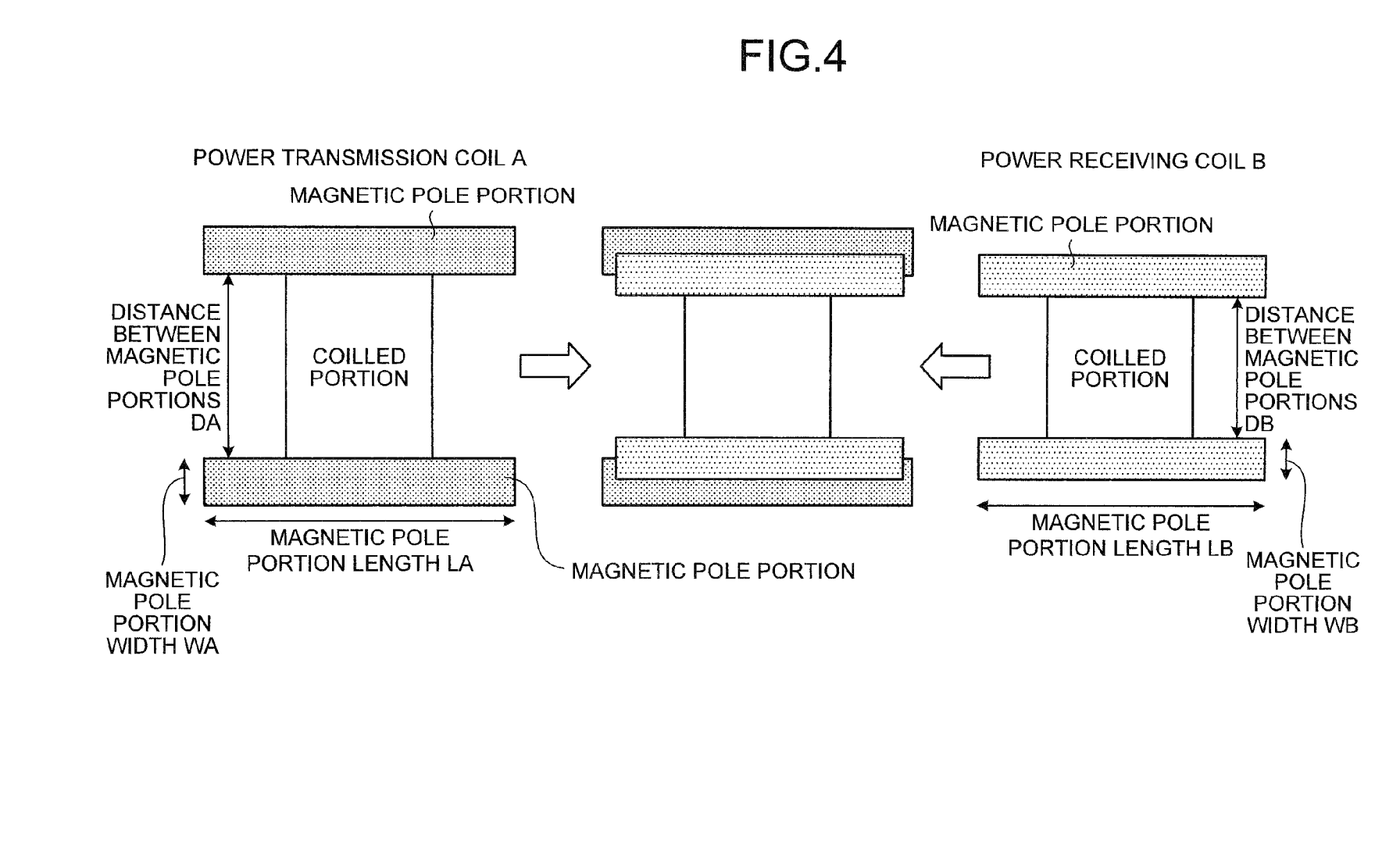
FIG. 4 is a view illustrating a relationship between sizes of magnetic pole portions of the power transmission coil and the power reception coil of the contactless power transfer apparatus of the present invention.

To that end, as in FIG. 4, a length LA of a magnetic pole portion of the power transmission coil and a length LB of a magnetic pole portion of the power reception coil are set to be substantially the same. It is at least necessary that the following requirement be satisfied:

$$0.5 \times LB \leq LA \leq 2 \times LB.$$

Furthermore, when a width of a magnetic pole portion of the power transmission coil is WA, a distance between the magnetic pole portions is DA, a width of the magnetic pole portion of the power reception coil is WB, and a distance between the magnetic pole portions is DB, it is set so as to satisfy the following so that the magnetic pole portion of the power transmission coil and the magnetic pole portion of the power reception coil always overlap with each other:

$$DB \leq DA \leq DB + 2 \times WB \text{ or } DA \leq DB \leq DA + 2 \times WA.$$

Furthermore, in order to prevent the voltage change of the power reception coil due to a difference in the gap length specification, the number of turns of the power transmission coil and the power reception coil is set as the following.

As in FIG. 13, the difference in the gap length specification mainly depends on whether the power transmission coil is placed on a surface of the ground or is buried in the ground. Therefore, in each specification, the voltage decrease of the power reception coil is restrained by unifying the number of turns of the power reception coil and by adjusting the number of turns of the power transmission coil according to the gap length.

That is, when the number of turns of the power transmission coil having the long gap length is N1L, and the number of turns of the power transmission coil having the short gap length is N1S, the number of turns of the power transmission coil of the contactless power supply transformer having a different gap length specification is determined so as to satisfy N1L≥N1S. Furthermore, the number of turns of the power transmission coil having the same gap length specification is to be the same number.

For example, in FIG. 2, the number of turns of a coil is expressed by changing a character of a coil from "C" to "N", such that the number of turns of the power transmission coil C1NS becomes N1NS, and the number of turns of the power reception coil C2NS becomes N2NS. Furthermore, a shape and a size of a core of each coil are substantially the same.

At this time, when the number of turns of the coil having a different specification of the electrical power to be supplied is N1NS=N1RS and N2NS=N2RS, power supply from the power transmission coil C1NS to the power reception coil C2RS in C1NS rated power becomes possible. Similarly, power feeding from C1RS to C2NS in C2NS rated power becomes possible.

Furthermore, when the number of turns of the coil having a different gap length specification is N1NL≥N1NS and N2NL=N2NS, power supply of rated power from the power transmission coil C1NL to the power reception coil C2NS in the C1NL gap length specification becomes possible. Similarly, power supply of the rated power from C1NS to C2NL in the gap length specification of C1NS becomes possible.

As described above, by setting the specifications of the core and the winding of the power transmission coil and the power reception coil, it is possible to combine a power transmission coil and a power reception coil each having electric power specification differing from each other by more than twice, or to combine a power transmission coil and a power reception coil each having gap length specification differing from each other by more than 1.5 times.

As a result, a ground facility for the contactless power transfer, in which the power transmission coil is placed, can be commonly used by vehicles installed with a power reception coil of various specifications, whereby it is possible to spread vehicle charging by the contactless power transfer.

Furthermore, since the vehicle installed with the power reception coil can receive power supply from the contactless power transfer facility provided with the power transmission coil of various specifications, it becomes more convenient.

Next, a commonly usable contactless power transfer apparatus experimentally produced by the present inventors is described.

Figure 5A:
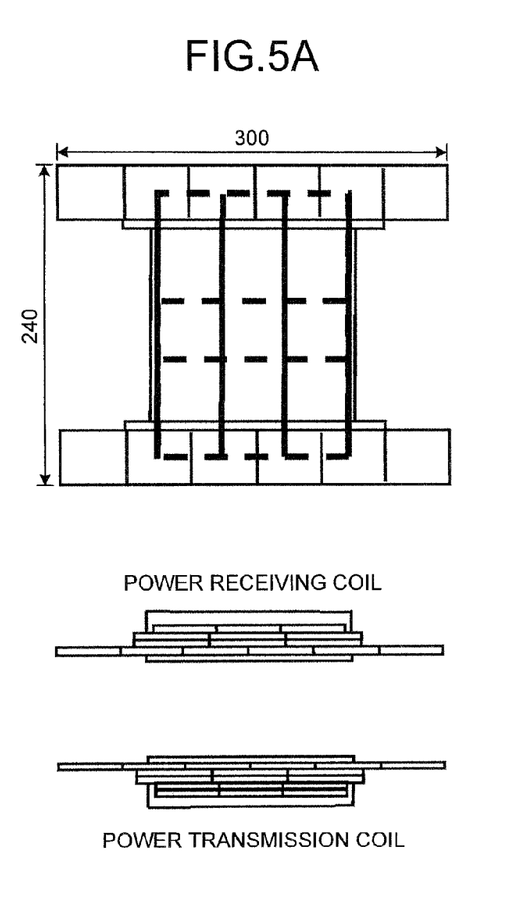
FIGS. 5A-5B are views view illustrating an exterior shape of cores of the power transmission coil and the power reception coil of the prototyped contactless power transfer apparatus.
Figure 5B:
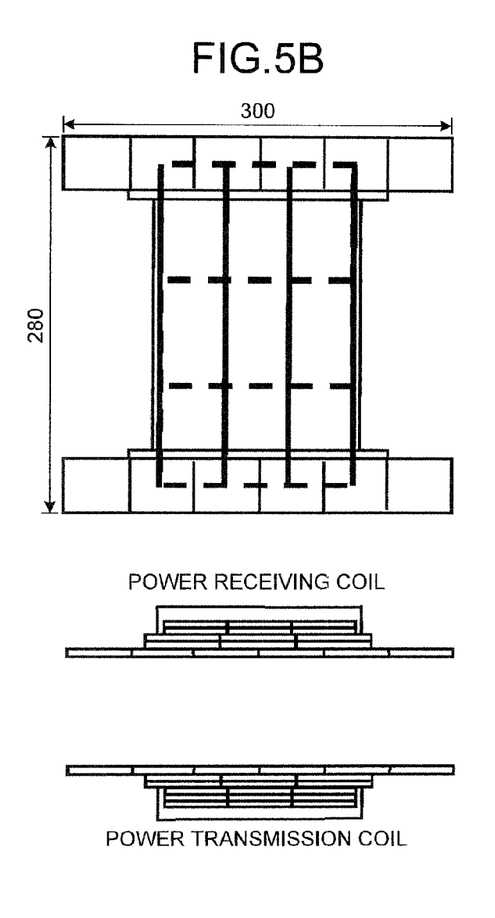
Figure 6:
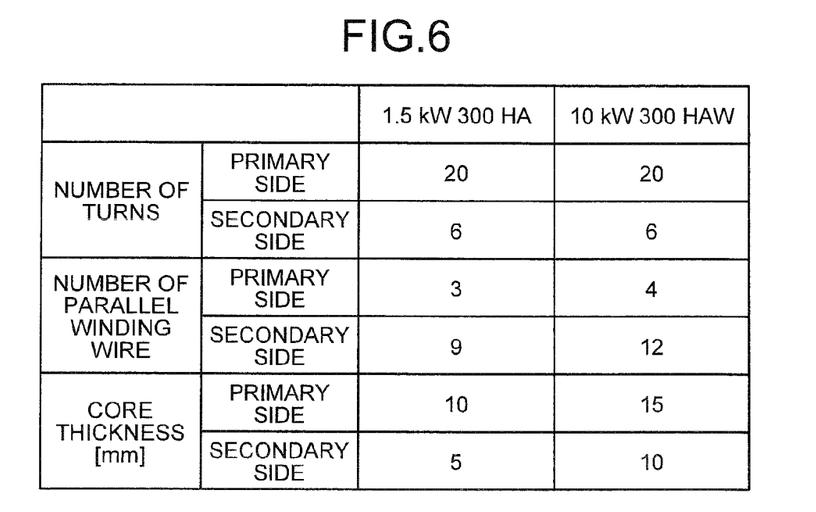
FIG. 6 is a view illustrating a number of turns, a number of parallel winding wire, and a core thickness of the power transmission coil and the power reception coil of FIG. 5.

The contactless power supply transformer used in this device is the contactless power supply transformer (300 HA) having a specification of the electrical power of 1.5 kW and the contactless power supply transformer of 10 kW (300 HAW). In FIG. 5A, an external form of the 300 HA H-shaped core is illustrated, and in FIG. 5B, an external form of the 300 HAW H-shaped core is illustrated. In FIG. 6, the number of turns, the parallel number of the winding wire, and a core thickness of these contactless power supply transformers are illustrated.

The core thickness is a thickness of the core of the coiled portion in FIG. 4.

Here, lengths of the magnetic pole portions of 300 HA and 300 HAW (300 mm) are unified. Furthermore, a size between outer ends of the magnetic pole portions is set to be 240 mm for 300 HA and 280 mm for 300 HAW. It is determined that the mutual magnetic pole portions overlap with each other when the power transmission coil of 300 HA is combined with the power reception coil of 300 HAW, or when the 300 HA power reception coil is combined with the 300 HAW power transmission coil. Furthermore, the number of turns of the power transmission coil is set to be the same for 300 HA and 300 HAW, and the number of turns of the power reception coil is set to be the same.

In order to study the common use of this 300 HA and the 300 HAW, features of the contactless power supply transformer including the 300 HA power transmission coil and the 300 HAW power reception coil, and features of the contactless power supply transformer including the 300 HAW power transmission coil and the 300 HA power reception coil are measured.

Figure 7A:
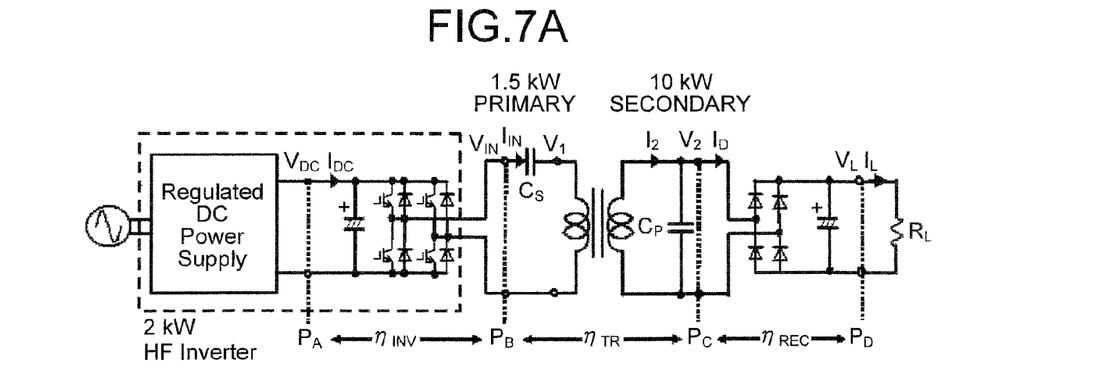
FIGS. 7A-7B are circuit diagrams of the contactless power transfer system in which the power transmission coil and the power reception coil having different specifications are combined.
Figure 7B:
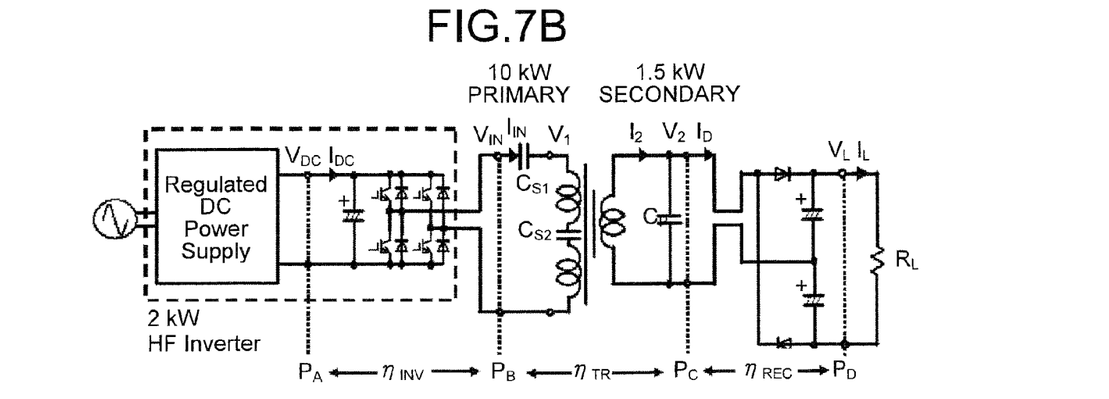

FIG. 7A is the circuit diagram of the contactless power transfer system in which the contactless power supply transformer includes the 300 HA power transmission coil and the 300 HAW power reception coil, and FIG. 7B is the circuit diagram of the contactless power transfer system in which the contactless power supply transformer includes the 300 HAW power transmission coil and the 300 HA power reception coil. In the circuit in FIG. 7A, a full-wave rectifier is connected to the secondary side power reception coil for rectification, and in the circuit in FIG. 7B, a double voltage rectifier is connected to the power reception coil for rectification.

Figure 8:
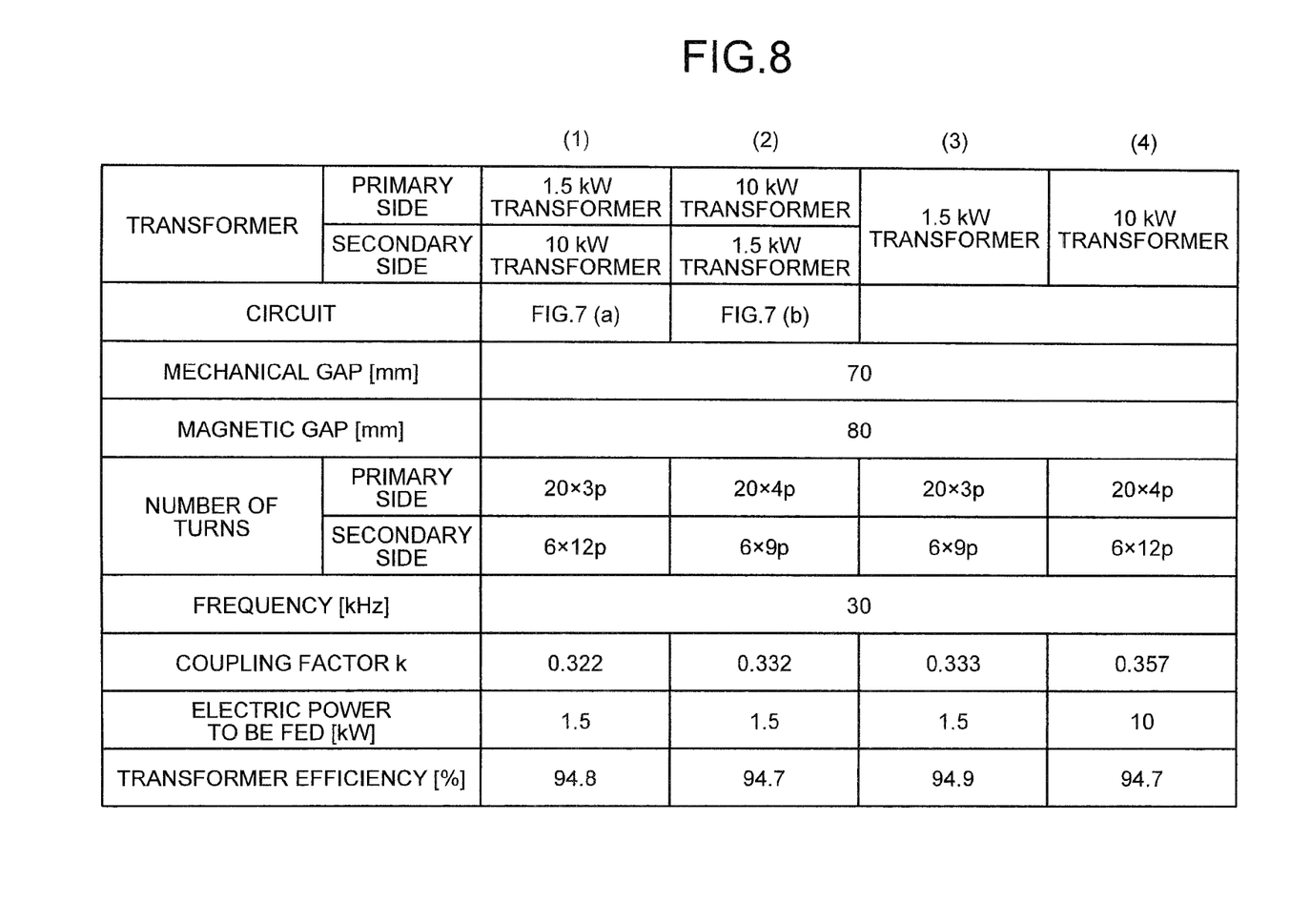
FIG. 8 is a view illustrating features of the contactless power transfer apparatus in which the power transmission coil and the power reception coil having the different specifications are combined.

In FIG. 8, measurement results of the coupling factor k and transformer efficiency (%) is illustrated in: (1) the contactless power transfer apparatus provided with the contactless power supply transformer combining the 300 HA power transmission coil and the 300 HAW power reception coil; (2) the contactless power transfer apparatus provided with the contactless power supply transformer combining the 300 HAW power transmission coil and the 300 HA power reception coil; (3) a contactless power transfer apparatus provided with the regular 300 HA; and (4) a contactless power transfer apparatus provided with a regular 300 HAW. A mechanical gap (gap between the power transmission coil and the power reception coil at the closest position) of each of the contactless power transfer apparatus is set to 70 mm, and a magnetic gap (gap between the magnetic pole portions of the power transmission coil and the power reception coil) is set to 80 mm. Furthermore, the number of turns of the power transmission coil is set to 20, and the number of turns of the power reception coil is unified to six (note that the parallel number of the winding is different), and the frequency of the high frequency power source is unified to 30 kHz. The electrical power to be supplied in (1) and (2) is set to the smaller of values of the electrical power to be supplied within the specifications of the electrical power of the power transmission coil and the power reception coil, i.e., 1.5 kW.

The coupling factor k of the contactless power transfer apparatus of (1) and (2) is not inferior to the contactless power transfer apparatus of regular (3) and (4).

Furthermore, the transformer efficiency (%) (representing a ratio of PC to PB in FIGS. 7A and 7B) of the contactless power transfer apparatus of (1) and (2) is not inferior to the contactless power transfer apparatus of regular (3) and (4).

Based on these measurement results, it is apparent that 300 HA and 300 HAW can be used commonly even when the specification of the electrical power to be fed is different by 6.7 times.

INDUSTRIAL APPLICABILITY

A contactless power transfer apparatus according to the present invention can be used commonly among contactless power supply transformers, each having a different specification, and can be widely used in movable objects such as an automobile, a carrier, a mobile robot, and the like.

REFERENCE SIGNS LIST

1 POWER TRANSMISSION COIL
2 POWER RECEPTION COIL
3 HIGH FREQUENCY POWER SOURCE
4 INVERTER
5 RECTIFIER
10 VARIABLE VOLTAGE RECTIFIER
20 INVERTER
30 CONTACTLESS POWER SUPPLY TRANSFORMER
31 POWER TRANSMISSION COIL
32 SERIES CAPACITOR
33 POWER RECEPTION COIL
34 PARALLEL CAPACITOR
40 RECTIFIER
50 WINDING WIRE
51 SECONDARY BATTERY
52 INVERTER
53 MOTOR
54 ENGINE
61 CORE
62 WINDING WIRE
63 CORE
64 WINDING WIRE
65 ALUMINUM BOARD
66 ALUMINUM BOARD
67 MAIN MAGNETIC FLUX
70 RECTANGULAR CORE
71 MAGNETIC POLE PORTION
72 MAGNETIC POLE PORTION
80 H-SHAPED CORE
81 VERTICAL BAR
82 VERTICAL BAR
83 HORIZONTAL BAR

The invention claimed is:

1. A contactless power transfer apparatus comprising:
a power transmission coil;
a primary side capacitor connected to the power transmission coil in series or parallel;
a power reception coil opposing the power transmission coil through a gap; and
a secondary side resonant capacitor connected to the power reception coil in parallel, wherein
power is supplied from the power transmission coil to the power reception coil,
the power transmission coil and the power reception coil includes:
a rectangular or H-shaped core having magnetic pole portions at both ends; and a wire wound around a core part between the magnetic pole portions, a specification of a power source frequency of the power transmission coil and a specification of a resonance frequency of the power reception coil are equal to each other, at least one of a specification of an electrical power and a specification of a gap length of the power transmission coil is different from corresponding specification of the power reception coil, when the specification of the electrical power of the power transmission coil and the specification of the electrical power of the power reception coil differ from each other, the power is supplied from the power transmission coil to the power reception coil by using smaller one of the electrical power of the power transmission coil and the electrical power of the power reception coil as a maximum electrical power capable of being supplied, and when the specification of the gap length of the power transmission coil and the specification of the gap length of the power reception coil differ from each other, the power is supplied by having the power transmission coil and the power reception coil oppose each other through the gap length, which is the specification of the power transmission coil.

2. The contactless power transfer apparatus of claim 1, wherein a number of turns of the wire wound around the core part of the power reception coil is constant.

3. The contactless power transfer apparatus of claim 2, wherein, when the specification of the gap length of the power transmission coil is the same as the specification of the gap length of the power reception coil, a number of turns of the wire wound around the core part of the power transmission coil is equal to a number of turns of the wire wound around a regular power transmission coil of the power reception coil, the regular power transmission coil having a specification of the electrical power and a specification of a gap length that are the same as the specification of the electrical power and the specification of the gap length of the power reception coil.

4. The contactless power transfer apparatus of claim 2, wherein, when the specification of the gap length of the power transmission coil is longer than the specification of the gap length of the power reception coil, a number of turns of the wire wound around the core part of the power transmission coil is greater than a number of turns of the wire wound around a regular power transmission coil of the power reception coil, the regular power transmission coil having a specification of the electrical power and a specification of the gap length that are the same as the specification of the electrical power and the specification of the gap length of the power reception coil.

5. The contactless power transfer apparatus of claim 1, wherein, when a coupling factor between the power transmission coil and the power reception coil is KAB, a coupling factor between the power transmission coil and a regular power reception coil, which has a specification of the electrical power and a specification of the gap length the same as the specification of the electrical power and the specification of the gap length of the power transmission coil, of the power transmission coil is KA, and a coupling factor between the power reception coil and a regular power transmission coil, which has a specification of the electrical power and a specification of the gap length the same as the specification of the electrical power and the specification of the gap length of the power reception coil, of the power reception coil is KB, $0.5KA \leq KAB \leq 2KA$ and $0.5KB \leq KAB \leq 2KB$.

6. The contactless power transfer apparatus of claim 1, wherein, when a length of the magnetic pole part of the power transmission coil is LA, a width thereof is WA, a distance between the magnetic pole parts at the both ends of the core is DA, a length of the magnetic pole parts of the power reception coil is LB, a width thereof is WB, and a distance between the magnetic pole parts at the both ends of the core is DB, $0.5 \times LB \leq LA \leq 2 \times LB$ $DB \leq DA \leq DB + 2 \times WB$ or $DA \leq DB \leq DA + 2 \times WA$.

7. The contactless power transfer apparatus of claim 1, wherein, a value CP of the secondary side resonant capacitor connected in parallel to the power reception coil is set so as to resonate with L2 at a power source frequency f0, L2 being a self-inductance of the power reception coil in a state in which the power transmission coil having a specification the same as the specification of the power reception coil is placed at a position of a gap length in an open state.

8. The contactless power transfer apparatus of claim 7, wherein
the primary side capacitor is connected in series between the power transmission coil and a high frequency power source, and
a value CS of the primary side capacitor is set so that an output power factor of the high frequency power source becomes one by connecting the secondary side resonant capacitor CP and the resistance load RL in parallel to the power reception coil.

9. The contactless power transfer apparatus of claim 8, further comprising an adjustment unit that adjusts the value CS of the primary side capacitor, wherein
the adjustment unit adjusts the value CS of the primary side capacitor so that the output power factor of the high frequency power source becomes one.

10. The contactless power transfer apparatus of claim 1, wherein the specification of the electrical power of the power transmission coil and the specification of the electrical power of the power reception coil differ from each other by more than twice.

11. The contactless power transfer apparatus of claim 1, wherein the specification of the gap length of the power transmission coil and the specification of the gap length of the power reception coil differ from each other by more than 1.5 times.

* * * * *